United States Patent [19]
Fujioka et al.

[11] Patent Number: 5,794,448
[45] Date of Patent: Aug. 18, 1998

[54] GAS TURBINE FUEL HEATING APPARATUS

[75] Inventors: Masanori Fujioka; Teruaki Sakata; Carmelo Osmeña Dilao, all of Takasago, Japan

[73] Assignee: Mitsubishi Jukogyo Kabushiki Kaisha, Tokyo, Japan

[21] Appl. No.: 628,301

[22] Filed: Apr. 5, 1996

[30] Foreign Application Priority Data

Apr. 14, 1995 [JP] Japan ................................. 7-089139

[51] Int. Cl.⁶ ........................................................ F02C 7/08
[52] U.S. Cl. ................................................ 60/736; 165/140
[58] Field of Search ........................... 60/736; 165/140, 165/122, DIG. 307, DIG. 310, DIG. 316

[56] References Cited

U.S. PATENT DOCUMENTS

| 374,094 | 11/1887 | Smith | 165/DIG. 316 |
|---|---|---|---|
| 3,977,196 | 8/1976 | Sedille | |
| 4,137,705 | 2/1979 | Andersen et al. | |
| 5,317,877 | 6/1994 | Stuart | 60/736 |
| 5,363,641 | 11/1994 | Dixon et al. | 60/736 |
| 5,392,595 | 2/1995 | Glickstein et al. | 60/736 |

FOREIGN PATENT DOCUMENTS

| 0 006 412 | 7/1978 | European Pat. Off. |
|---|---|---|
| 0 584 958 | 3/1994 | European Pat. Off. |
| 2 315 673 | 6/1975 | France |
| 63-120826 | 5/1988 | Japan |
| 2-112631 | 4/1990 | Japan |
| 6-146924 | 5/1994 | Japan |

OTHER PUBLICATIONS

06146924 Japanese Patent Abstract; May 1994, 1 page.
631124833 Japanese Patent Abstract; May 1988, 1 page.

*Primary Examiner*—Charles G. Freay
*Attorney, Agent, or Firm*—Wenderoth, Lind & Ponack

[57] ABSTRACT

A fuel heating apparatus for a gas turbine is provided in which contact of high temperature air and fuel at the time of fuel leakage is prevented so that safety is ensured. The apparatus includes a turbine cooling air cooler of the air cooling type for cooling turbine cooling air and a fuel heater connected to the exhaust side of the turbine cooling air cooler for heating the fuel by the refrigerant air. The turbine cooling air cooler and the fuel heater 4, respectively, form a separate unit so that contact of high temperature air and fuel at the time of fuel leakage is prevented.

12 Claims, 4 Drawing Sheets

GAS TURBINE FUEL HEATING APPARATUS

BACKGROUND OF THE INVENTION

1. Field of the Invention

The present invention relates to a gas turbine fuel heating apparatus for heating gas turbine fuel by use of heat to be wasted.

2. Description of the Prior Art

Generally in the prior art, in order to cool a rotor, moving and stationary blades etc. of a gas turbine, high pressure air in the turbine casing is extracted and cooled at a turbine air cooler (herein referred to as "TCA cooler") of air cooling type. However, if the gas turbine is of a large size type, the heat wasted outside of the system becomes large and the efficiency (fuel consumption) of the gas turbine is reduced.

Therefore, systems to enhance efficiency (fuel consumption) by heating the gas turbine fuel by use of the heat waste outside the system have been proposed. FIGS. 3 to 5 show examples of such prior art gas turbine fuel heating systems.

FIG. 3 shows a system in which air of which temperature is elevated in compression stages of a gas turbine driven compressor is extracted and fuel is heated at a heater 21 by heat of the extracted air so that the heat of the extracted air to be wasted is made use of for heating the fuel. The air is further cooled at a cooler 22 by a cooling water and is used as a cooling air for a rotor, moving and stationary blades etc.

FIG. 4 shows a system in which fuel is heated by making heat exchange at a heat exchanger 26 between a normal temperature fuel supplied with pressure from a fuel tank 23 to a combustor 24 and a high temperature cooling air extracted from a compressor 25 so that the high temperature air is cooled to be used for cooling of a rotor, moving and stationary blades etc.

FIG. 5 shows a system for using waste heat in which heat exchange is made at a cooler 28 between a turbine cooling air 27 extracted from a compressor and a cooling medium (pressurized water) 29 to heat the pressurized water 29 so that the gas turbine fuel is heated at a heater 30 by the pressurized water.

In the gas turbine fuel heating systems in the prior art as described above, the system shown in FIG. 3 has such shortcomings that it, being of an indirect heating method using water, requires a separate heater 21 and cooler 22, which results in a high amount of initial investment cost.

The system shown in FIG. 4 is of a direct heating method using oil as fuel in which the fuel oil is heated by extracted air so that the extracted air is cooled by the fuel oil.

Also the system shown in FIG. 5, is of an indirect heating method in which pressurized water heated by extracted air heats fuel. This system also has shortcomings in that it requires a separate cooler 28 and heater 30 which results in a high amount of initial investment cost.

Thus, as a whole, the system shown in FIGS. 3 and 5 require a high initial investment cost and the system FIG. 4 has a risk that fuel may leak due to aged deterioration of heat exchanger and come into contact with a high temperature air.

SUMMARY OF THE INVENTION

It is therefore an object of the present invention to provide a gas turbine fuel heating apparatus which avoids the above-mentioned shortcomings in the prior art.

One feature of the gas turbine fuel heating apparatus according to the present invention is that it comprises a TCA cooler of air cooling type for cooling a turbine cooling air and a fuel heater connected to the leaving side of a refrigerant air of the TCA cooler of air cooling type for heating the fuel by the refrigerant air.

Another feature of the gas turbine fuel heating apparatus according to the present invention is that the TCA cooler of air cooling type comprises a plurality of motor driven fans to supply the refrigerant air.

Further, a feature of the gas turbine fuel heating apparatus according to the present invention is that the fuel heater is constructed substantially of the same size as the TCA cooler of air cooling type and is provided directly on the TCA cooler of air cooling type.

Still further, a feature of the gas turbine fuel heating apparatus according to the present invention is that the turbine cooling air of the TCA cooler of air cooling type and the fuel of the fuel heater flow in opposite directions with respect to each other in the TCA cooler of air cooling type and said fuel heater, respectively.

Further, a feature of the gas turbine fuel heating apparatus according to the present invention is that the exchanger tubes contained in the TCA cooler of air cooling type and the fuel heater, in which the turbine cooling air and the fuel flow, are finned tubes.

Further, a feature of the gas turbine fuel heating apparatus according to the present invention is that the fuel heated by the fuel heater is gas or a liquid fuel such as oil.

According to the present invention, as the refrigerant air is heated by cooling the turbine cooling air and the fuel is heated indirectly by the refrigerant air of the outlet side of the TCA cooler, the apparatus has a long useful life. Further, as the TCA cooler and the fuel heater are provided separately from each other, safety at the time of fuel leakage can be ensured.

Further, not only gas but also a liquid fuel like oil can be used as a fuel, and even if the atmospheric air temperature changes, the apparatus is constructed so as to make the fan revolution changeable to maintain a uniform temperature of the refrigerant air leaving the TCA cooler and entering the fuel heater.

Furthermore, as cooling of the turbine cooling air and heating of the fuel are made at the TCA cooler and the fuel heater connected thereto, respectively, the initial investment cost can be lowered as compared with the indirect heating system using pressurized water.

DETAILED DESCRIPTION OF THE INVENTION

Figure 1:
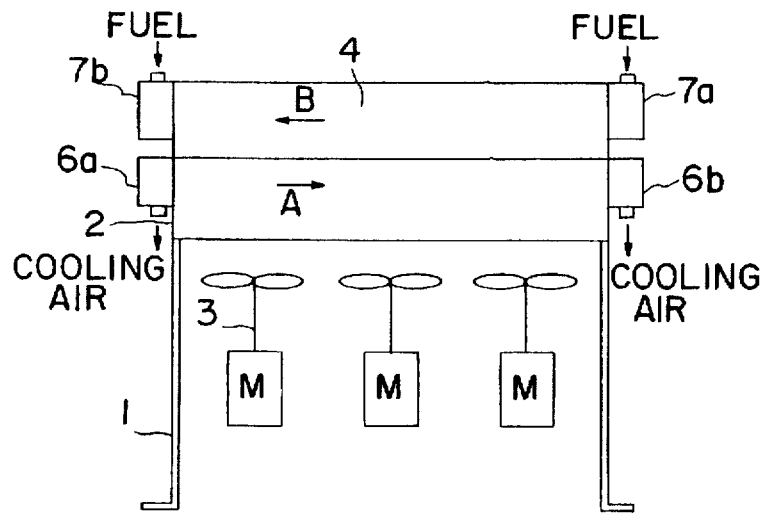
FIG. 1 is an explanatory drawing of an example of a preferred embodiment according to the present invention.
Figure 1A:
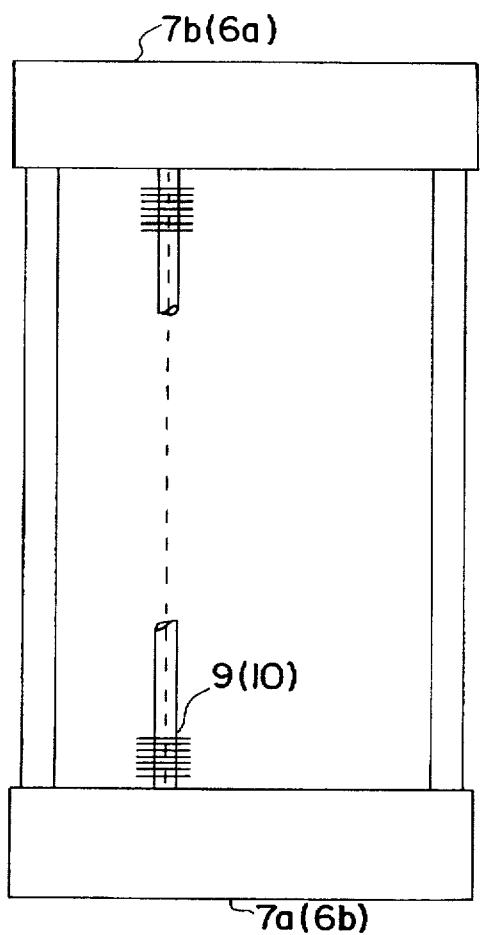
FIG. 1A is a schematic representation of a fuel heater (TCA cooler) of the example of the embodiment of FIG. 1.
Figure 2:
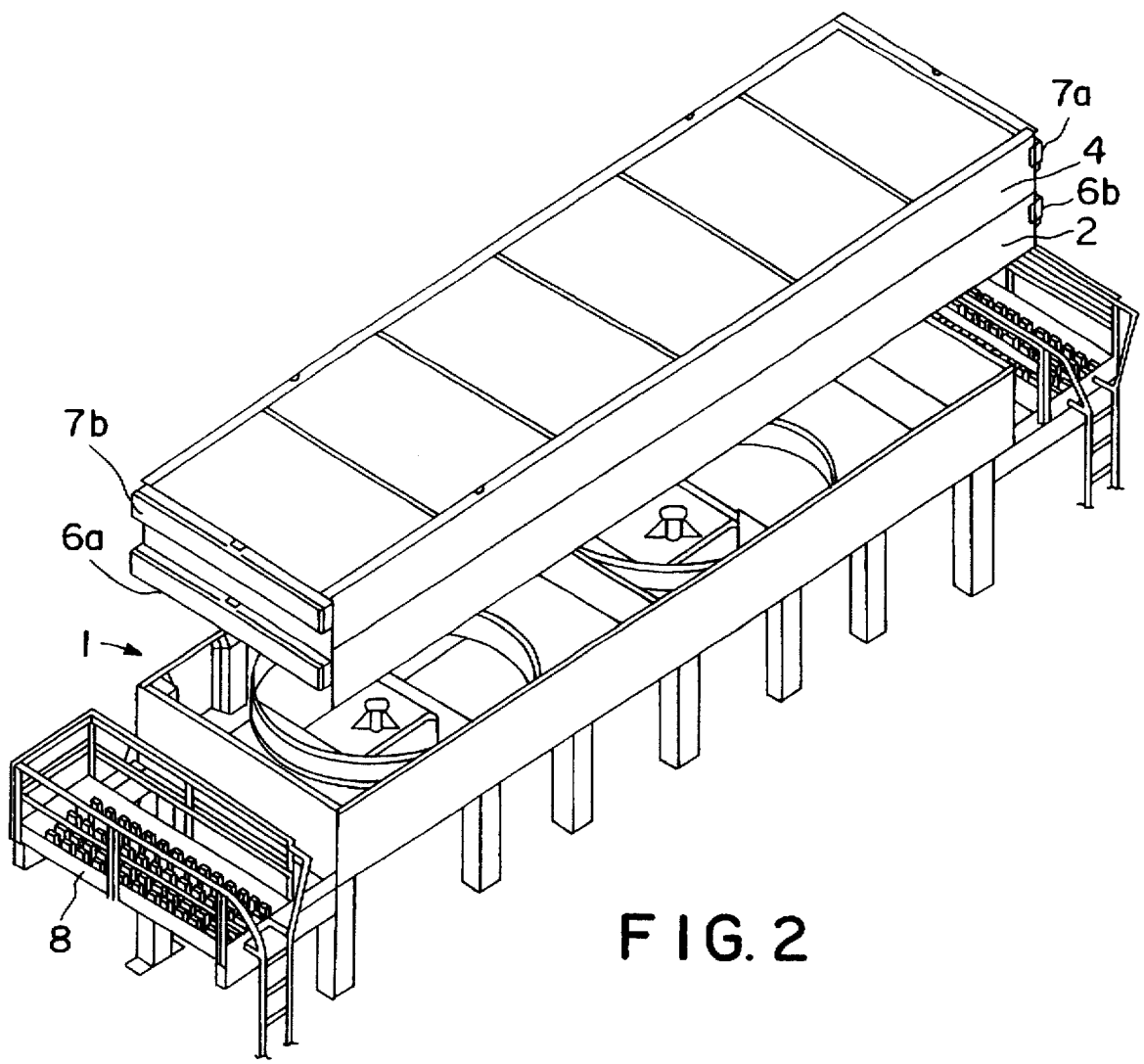
FIG. 2 is a perspective view of the preferred embodiment; Shown in FIG. 1
Figure 3:
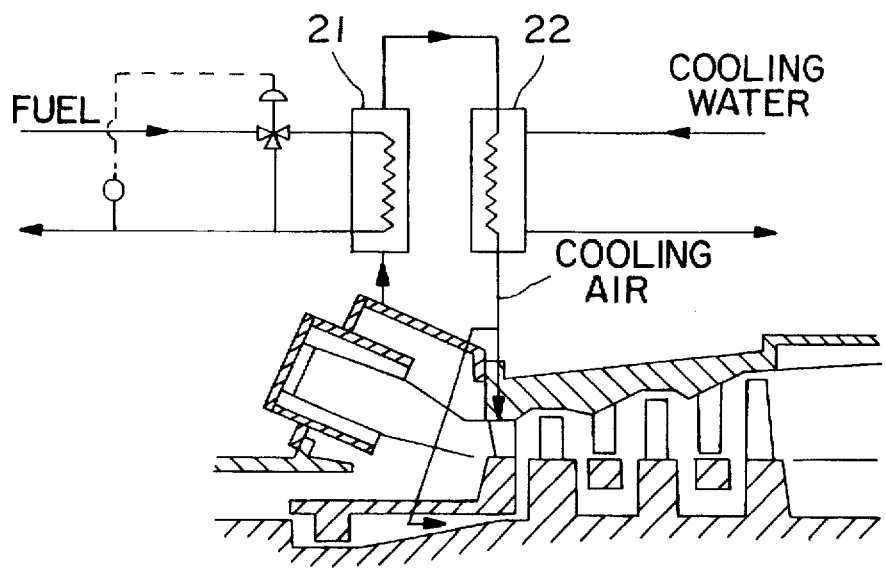
FIG. 3 is a schematic drawing of an example of a gas turbine fuel heating apparatus in the prior art.
Figure 4:
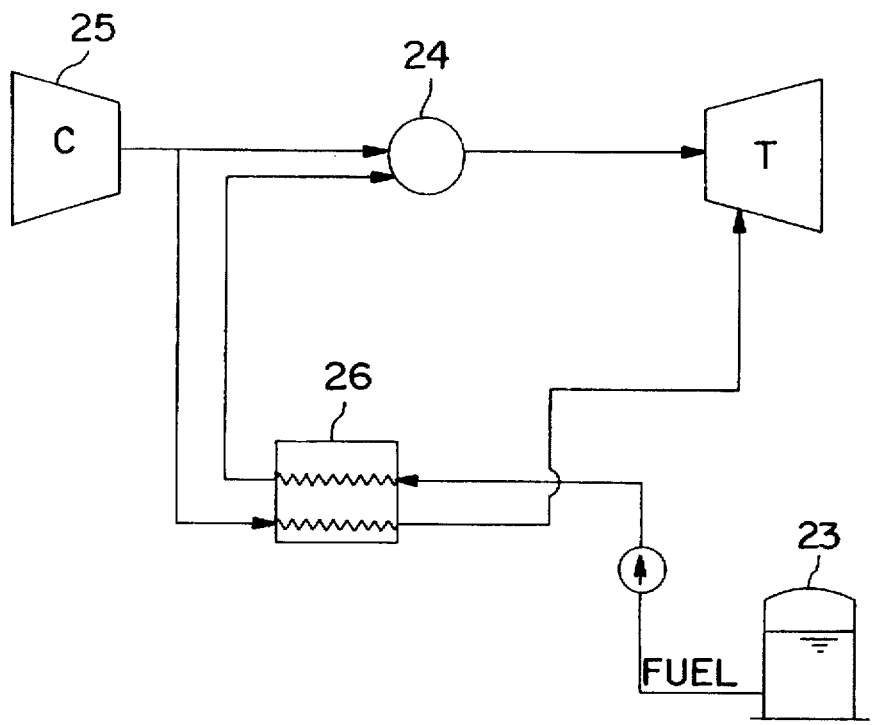
FIG. 4 is a schematic drawing of another example of a gas turbine fuel heating apparatus in the prior art.
Figure 5:
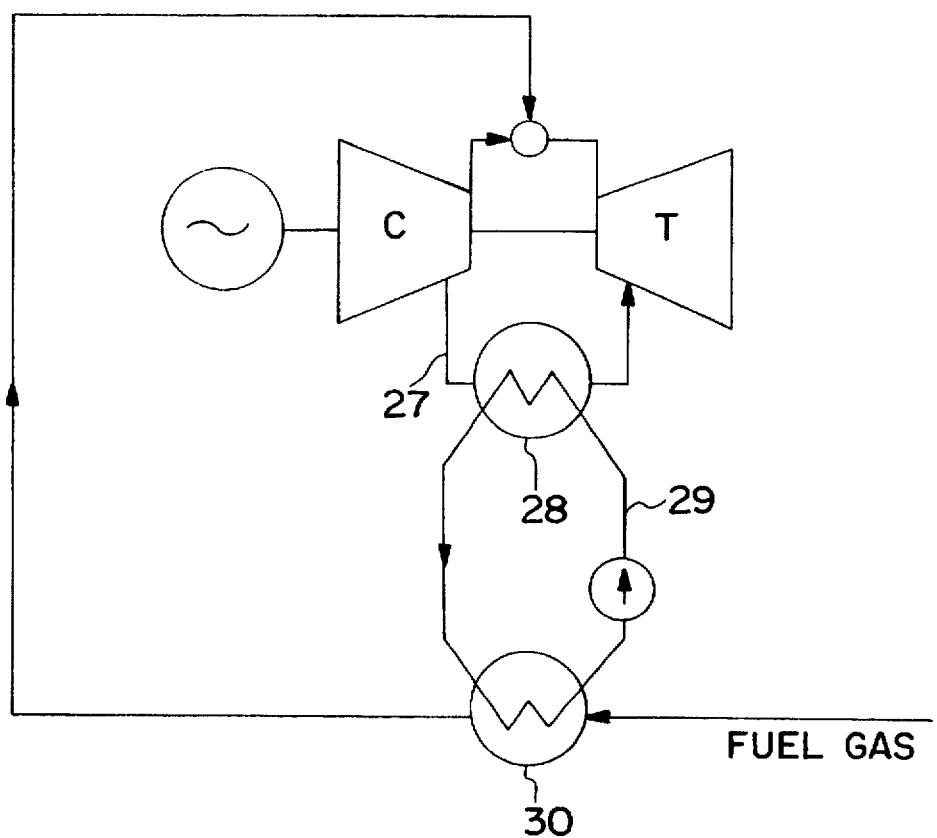
FIG. 5 is a schematic drawing of a further example of a gas turbine fuel heating apparatus in the prior art.

A preferred embodiment according to the present invention is described with reference to FIGS. 1 and 2. As shown in FIG. 1, a TCA cooler 1 comprises an outer shell 2, disposed on an upper part, containing a tube nest (not shown in the figure) through which cooling air flows to cool a rotor, moving and stationary blades etc. of a gas turbine. Also, a plurality of motor driven fans 3, disposed on a lower part, to supply a refrigerant air (atmospheric air) to cool the tube nest. A pressurized and temperature-risen air extracted from a compressor or a pressurized and temperature-risen air extracted from compression stages of a gas turbine driven compressor, etc. is used.

On the upper side of the TCA cooler 1 which is the leaving or exit side of the refrigerant air of the TCA cooler 1, a fuel heater 4 is provided so that an indirect heating construction is employed in which fuel is indirectly heated by the refrigerant air heated at the TCA cooler and exiting there. Within the fuel heater 4, a tube nest through which fuel gas or fuel oil flows is contained.

The fuel heater 4 and said TCA cooler 1 are constructed substantially of the same size, and are arranged so that the fuel heater 4 is directly position on the TCA cooler 1. On both sides of the TCA cooler 1, an inlet side header 6a for introducing the cooling air and an outlet side header 6b are provided. Also, on one side of the fuel heater 4 where the header 6b is provided, an inlet side header 7a of fuel is provided, and on the other side of the fuel heater 4 where the header 6a is provided, an outlet side header 7b of fuel is provided. Thus, the cooling air and the fuel flows in the TCA cooler 1 and the fuel heater 4, respectively, in opposite directions with respect to each other as shown by the arrows A and B. Incidentally, numeral 8 in FIG. 2 designates a walkway for headers.

For heat exchanger tubes of multitubular type to construct the tube nests contained in the TCA cooler 1 and the fuel heater 4, finned tubes 9 are used in order to enhance the heat exchange performance with the refrigerant air.

In this preferred embodiment, the refrigerant air (atmospheric air) supplied by the fans 3 cools the cooling air flowing in the exchanger tubes 10 of the tube nest of the TCA cooler 1 and is heated itself. The cooled air is sent from the header 6b to the rotor, the moving and stationary blades etc. of the gas turbine. The air heated at the tube nest of the TCA cooler 1 enters the tube nest of the fuel heater 4 on the upper side of the TCA cooler 1 and heats the fuel flowing in the heat exchanger tubes of the tube nest and then the heated fuel is sent from the header 7b to a combustor of the gas turbine.

As described above, in this preferred embodiment, as the fuel is heated by the air which cools the cooling air and leaves the TCA cooler 1, the heat to be wasted outside the system can be effectively utilized, and as the fuel is indirectly heated by the heat of the cooling air, the useful life of the apparatus can be increased.

Also, as the TCA cooler 1 and the fuel heater 4, is constructed as a separate unit, safety in the event of fuel leakage can be ensured.

Further, not only gas but also a liquid fuel like oil can be used as a fuel, and even if the atmospheric air temperature changes, the revolution of the fans 3 is controlled and the temperature of the air leaving the TCA cooler 1 and entering the fuel heater 4 can be maintained uniformly.

Furthermore, in this preferred embodiment, cooling of the cooling air and heating of the fuel is performed by the TCA cooler 1 and the fuel heater 4 respectively. Therefore, the initial investment cost can be lowered as compared with the indirect heating method using pressurized water in the prior art.

In the gas turbine fuel heating apparatus according to the present invention, as the heat of the refrigerant air which cools the cooling air for cooling the rotor, the moving and stationary blades etc. of a gas turbine and leaves the TCA cooler is effectively made use of for heating the fuel at the fuel heater, the efficiency of gas turbine can be enhanced. Also as the construction is simple, in that the TCA cooler and the fuel heater are connected to each other and the refrigerant air leaving the TCA cooler is passed through the fuel heater, the initial investment cost is low as compared with an indirect heating method using water in the prior art or an indirect heating method using pressurized water in the prior art. Further, the risk of fuel leaking and making contact with high pressure air as in an indirect heating method in the prior art, can be avoided.

Accordingly, the present invention can contribute to enhancement of gas turbine efficiency and to enhancement of gas turbine reliability.

While the preferred form of the present invention has been described, variations thereto will be apparent to those skilled in the art within the scope of the present inventive concepts which are delineated by the following claims.

What is claimed is:

1. A fuel heating apparatus for a gas turbine comprising:
   an air cooler for cooling turbine cooling air, said air cooler having a refrigerant air entrance side and a refrigerant air exit side; and
   a fuel heater for heating fuel flowing through said fuel heater, said fuel heater being provided on said air cooler at said refrigerant air exit side.

2. The fuel heating apparatus as claimed in claim 1, wherein said fuel heater is of a size which is substantially the same as said air cooler, and said fuel heater is provided directly on said turbine air cooler so as to substantially overlap said air cooler.

3. The fuel heating apparatus as claimed in claim 1, wherein air to be cooled flows through said air cooler in a first direction and fuel to be heated flows through said fuel heater in a second direction, said first direction being opposite to said second direction.

4. The fuel heating apparatus as claimed in claim 1, further comprising finned heat exchanger tubes provided in said air cooler and finned heat exchanger tubes provided in said fuel heater for conducting flows of air and fuel, respectively.

5. The fuel heating apparatus as claimed in claim 1, wherein said air cooler includes a plurality of motor driven fans for supplying refrigerant air.

6. The fuel heating apparatus as claimed in claim 5, further comprising finned heat exchanger tubes provided in said air cooler and finned heat exchanger tubes provided in said fuel heater for conducting air flow and fuel flow, respectively.

7. The fuel heating apparatus as claimed in claim 6, wherein air to be cooled flows through said air cooler in a first direction and fuel to be heated flows through said fuel heater in a second direction, said first direction being opposite to said second direction.

8. The fuel heating apparatus as claimed in claim 5, wherein said fuel heater is of a size which is substantially the same as said air cooler, and said fuel heater is provided directly on said air cooler so as to substantially overlap said air cooler.

9. The fuel heating apparatus as claimed in claim 5, further comprising finned heat exchanger tubes provided in said air cooler and finned heat exchanger tubes provided in said fuel heater for conducting air flow and fuel flow, respectively.

10. The fuel heating apparatus as claimed in claim 1, wherein the fuel heated in said fuel heater is gas.

11. The fuel heating apparatus as claimed in claim 1, wherein the fuel heated in said fuel heater is a liquid fuel.

12. The fuel heating apparatus as claimed in claim 1, wherein the liquid fuel is oil.

* * * * *